United States Patent
Su

(10) Patent No.: US 9,570,932 B2
(45) Date of Patent: Feb. 14, 2017

(54) CHARGING CURRENT SETTING METHOD AND CHARGING MODULE

(71) Applicant: Anpec Electronics Corporation, Hsin-Chu (TW)

(72) Inventor: Chih-Heng Su, Hsinchu (TW)

(73) Assignee: Anpec Electronics Corporation, Hsin-Chu (TW)

( * ) Notice: Subject to any disclaimer, the term of this patent is extended or adjusted under 35 U.S.C. 154(b) by 200 days.

(21) Appl. No.: 14/568,118

(22) Filed: Dec. 12, 2014

(65) Prior Publication Data

US 2016/0079775 A1 Mar. 17, 2016

(30) Foreign Application Priority Data

Sep. 12, 2014 (TW) .............................. 103131563 A

(51) Int. Cl.
*H02J 7/00* (2006.01)

(52) U.S. Cl.
CPC .............. *H02J 7/007* (2013.01); *H02J 7/0052* (2013.01); *H02J 2007/0062* (2013.01)

(58) Field of Classification Search
CPC ................................ H02J 7/007; H02J 7/0052
USPC ......................................................... 320/107
See application file for complete search history.

(56) References Cited

U.S. PATENT DOCUMENTS

| 8,035,350 | B2 * | 10/2011 | Aradachi et al. | ..... H02J 7/0083 320/152 |
| 8,471,524 | B2 * | 6/2013 | Xiao et al. | ............ H02J 7/0072 320/107 |
| 2012/0249084 | A1 | 10/2012 | Vilhauer | |

FOREIGN PATENT DOCUMENTS

| TW | 201242214 | 10/2012 |
| TW | 201304351 | 1/2013 |
| TW | 201330445 | 7/2013 |
| TW | 201424192 | 6/2014 |

* cited by examiner

*Primary Examiner* — Sun Lin
(74) *Attorney, Agent, or Firm* — Winston Hsu; Scott Margo

(57) ABSTRACT

A charging current setting method for a charging module includes detecting at least two voltage values associated with two input current values of an input voltage signal at an input terminal of the charging module to calculate an input resistance; setting a lower limit voltage value of the input voltage signal according to the input resistance; controlling an input current to increase its magnitude, so that voltage level of the input voltage signal decreases in accordance with increasing level of the input current; controlling the input voltage signal to remain on the lower limit voltage value when the input voltage signal is decreasing and reaches the lower limit voltage value, and recording a magnitude of the input current as an upper limit current value when the input voltage signal is on the lower limit voltage value and the input current becomes stable; and determining a charging current value of the charging module according to the upper limit current value.

12 Claims, 4 Drawing Sheets

CHARGING CURRENT SETTING METHOD AND CHARGING MODULE

BACKGROUND OF THE INVENTION

1. Field of the Invention

The present invention relates to a charging current setting method and a charging module, and more particularly, to a charging current setting method and a charging module capable of setting a charging current of an electronic device.

2. Description of the Prior Art

In recent years, portable electronic devices are widely available, and common portable electronic devices such as mobile phones, laptops, tablets and digital cameras have become indispensable in our daily lives. In order to realize the portability of portable electronic devices, most of the portable electronic devices are equipped with durable rechargeable batteries. This is convenient for the user to carry the portable electronic devices for long time.

Unavoidably, the rechargeable battery of the portable electronic devices should be charged when the charge stored in the battery is used up; hence, various charging methods and charging interfaces are developed in the industry. The user may always desire to increase the charging speed when charging a portable electronic device. However, a faster charging speed means a larger current flowing from the power terminal to the rechargeable battery via the adaptor, which increases the risk of damaging the adaptor or the charging module. In general, different adaptors may have different loading capability for carrying currents having different magnitudes. Currently available charging methods always operate in a predetermined mode (e.g., the constant voltage mode or constant current mode) with a power supply terminal or a charging module of a power receiving terminal. These methods cannot apply different charging currents having different magnitudes to adapt to the loading capability of different adaptors. If the loading capability of an adaptor is smaller, a larger charging current cannot enhance the charging efficiency and even damage the adaptor. If the loading capability of an adaptor is large enough, a lower charging current cannot effectively realize the performance of the adaptor, such that the required charging time may increase. Thus, there is a need for improvement over the prior art.

SUMMARY OF THE INVENTION

It is therefore an objective of the present invention to provide a charging current setting method and a charging module for a portable electronic device, which are capable of performing charging with an adaptive charging current according to the electrical characteristics of the adaptor and power supply terminal connected to the portable electronic device.

The present invention discloses a charging current setting method for a charging module. The charging current setting method comprises detecting at least one voltage value of an input voltage signal in an input terminal of the charging module to calculate an input resistance; setting a lower limit voltage value according to the input resistance; controlling an input current to increase, so that the input voltage signal decreases in accordance with the increasing input current; controlling the input voltage signal to remain on the lower limit voltage value when the input voltage signal decreases to the lower limit voltage value, and recording a magnitude of the input current as an upper limit current value after the input current becomes stable; and determining a charging current value of the charging module according to the upper limit current value.

The present invention further discloses a charging module, which comprises a charging device, a voltage detector, and a control module. The voltage detector is utilized for detecting at least one voltage value of an input voltage signal in an input terminal of the charging module to calculate an input resistance. The control module, coupled to the charging device and the voltage detector, is utilized for executing the following steps: setting a lower limit voltage value according to the input resistance; controlling an input current to increase, so that the input voltage signal decreases in accordance with the increasing input current; controlling the input voltage signal to remain on the lower limit voltage value when the input voltage signal decreases to the lower limit voltage value, and recording a magnitude of the input current as an upper limit current value after the input current becomes stable; and determining a charging current value of the charging module according to the upper limit current value. The charging device performs charging via the charging current value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
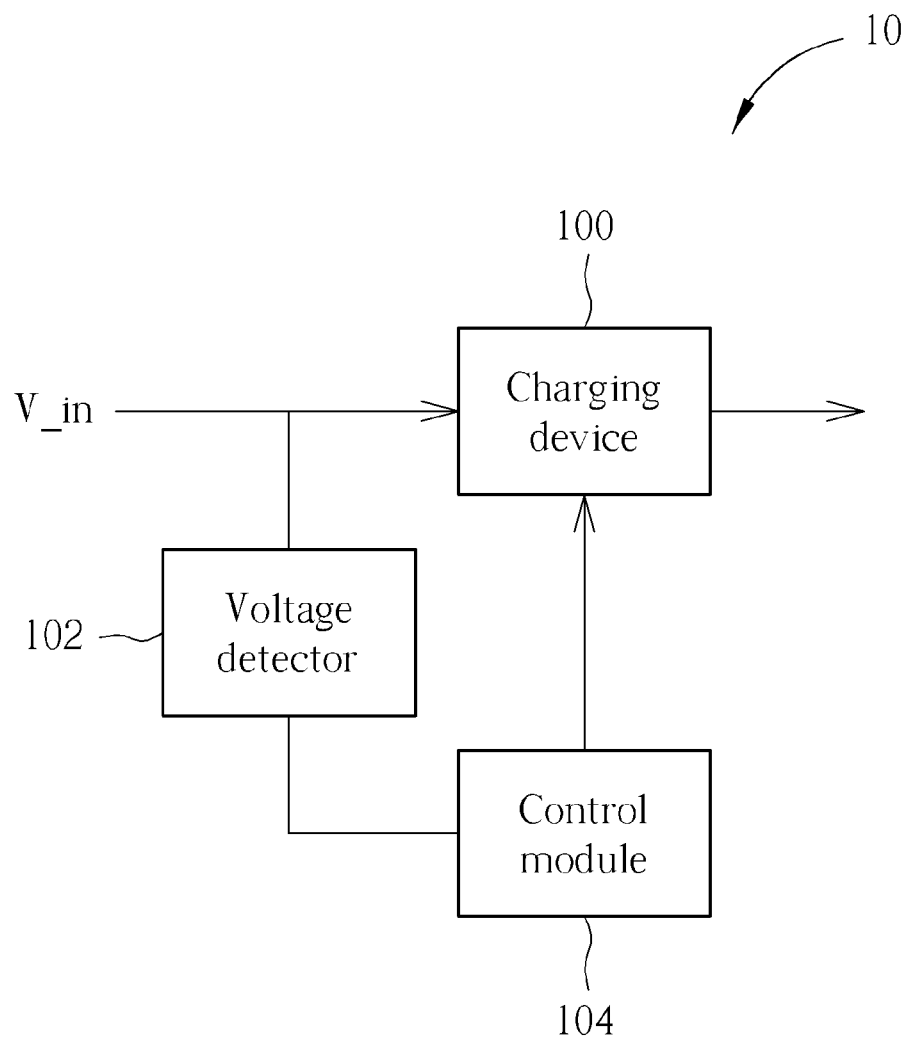
FIG. 1 is a schematic diagram of a charging module according to an embodiment of the present invention.

Please refer to FIG. 1, which is a schematic diagram of a charging module 10 according to an embodiment of the present invention. As shown in FIG. 1, the charging module 10 includes a charging device 100, a voltage detector 102 and a control module 104. The charging device 100 is utilized for charging a rechargeable battery. The voltage detector 102 may detect at least one voltage value of an input voltage signal V_in in an input terminal of the charging module 10, to calculate an input resistance R_in. The control module 104, coupled to the charging device 100 and the voltage detector 102, may determine a charging current value after calculating the input resistance R_in, and control the charging device 100 to perform charging via the determined charging current value.

Figure 2:
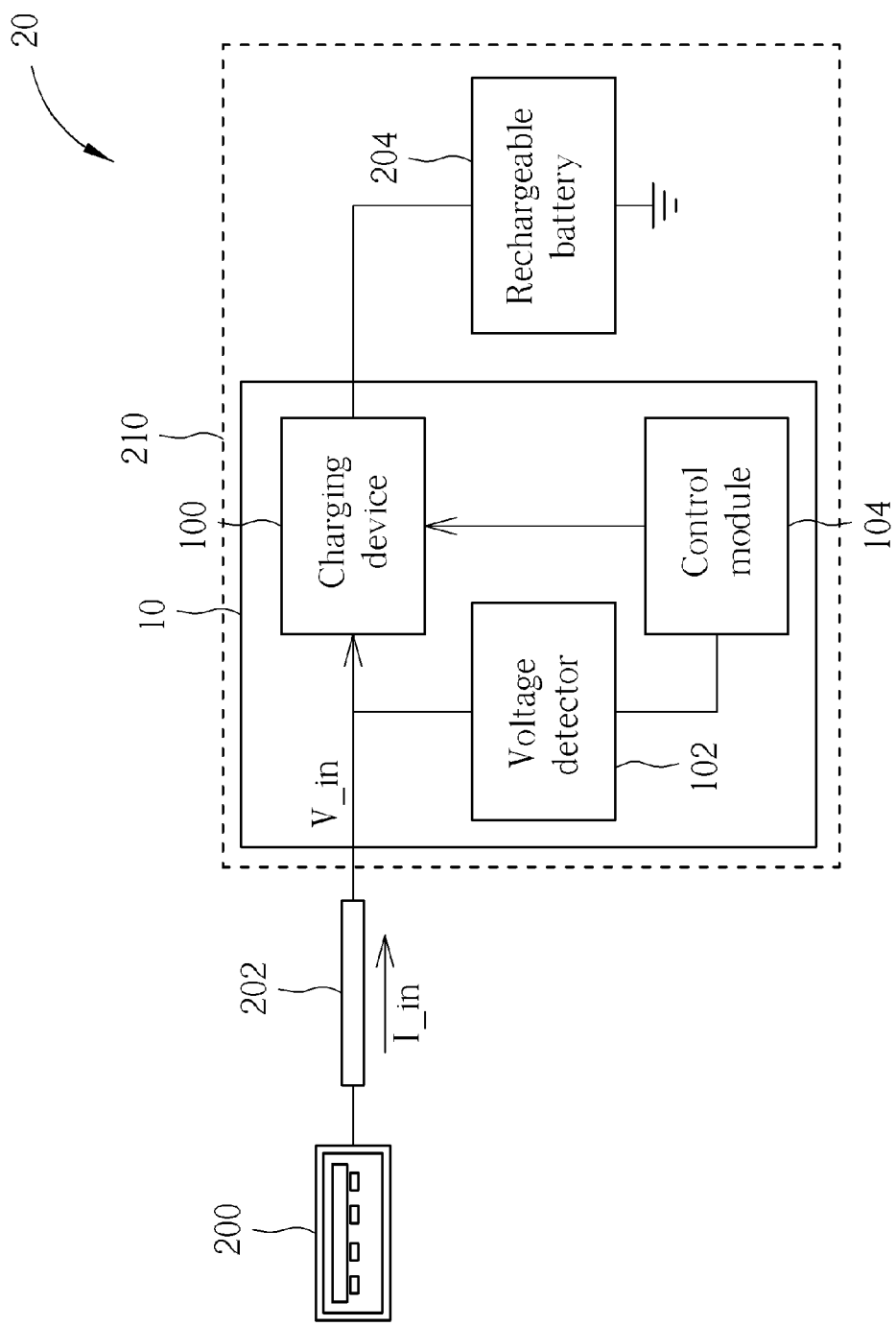
FIG. 2 is a schematic diagram of a charging system according to an embodiment of the present invention.

Please refer to FIG. 2, which is a schematic diagram of a charging system 20 according to an embodiment of the present invention. As shown in FIG. 2, the charging system 20 includes a power supply terminal 200, an adaptor 202, a rechargeable battery 204 and the charging module 10 shown in FIG. 1. The rechargeable battery 204 and the charging module 10 are disposed in a power receiving device 210. After the power receiving device 210 is connected to the adaptor 202, a current may flow from the power supply terminal 200 to charge the rechargeable battery 204 via the adaptor 202 and the charging module 10. The power supply terminal 200 may be a general alternating circuit (AC) power output terminal, a power supply, a mobile power bank or any electronic device having power supply functions. The power receiving device 210 may be any electronic device, portable device or vehicle device. The power receiving device 210 having the rechargeable battery 204 may be supplied with required power via the rechargeable battery 204, and may receive charging currents via a universal serial bus (USB) interface, a micro USB interface or other interfaces capable of power transmission functions. The adaptor 202 may be a connecting wire or a connector, for connecting a power output interface of the power supply terminal 200 with a power input interface of the power receiving device 210 and providing the conversion between different types of input interfaces and output interfaces.

Since the adaptors with different standards are adapted to different input interfaces and output interfaces, they may possess different electrical characteristics (e.g., internal resistance). The different electrical characteristics may have different upper limits of charging currents. Therefore, when the power receiving device 210 is connected to the adaptor 202, the charging module 10 may determine the upper limit of the current transmitted by the power supply terminal 200 and the adaptor 202 before starting to charge, in order to determine the optimal charging current value.

Figure 3:
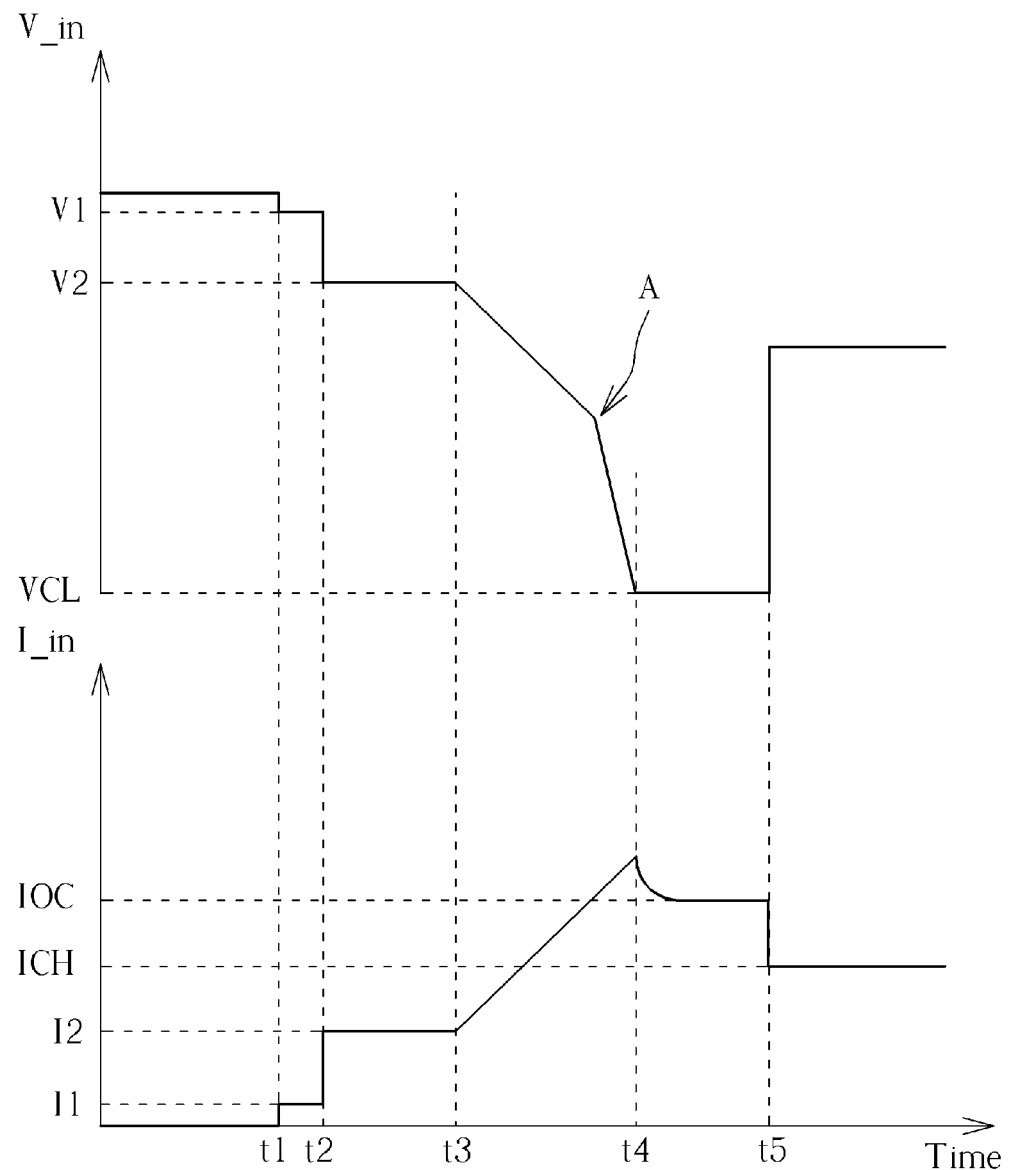
FIG. 3 is a waveform diagram of a charging current setting method according to an embodiment of the present invention.

In detail, please refer to FIG. 3, which is a waveform diagram of a charging current setting method according to an embodiment of the present invention. First of all, the voltage detector 102 may detect at least one voltage value of the input voltage signal V_in in an input terminal of the charging module 10, where the at least one voltage value may be utilized for calculating the input resistance R_in. As shown in FIG. 3, at time t1, the control module 104 may control the charging device 100 to charge with a current value I1. At this moment, the voltage detector 102 may detect that the voltage value of the input voltage signal V_in is V1. Then, at time t2, the control module 104 controls the charging device 100 to charge with a current value I2. At this moment, the voltage detector 102 may detect that the voltage value of the input voltage signal V_in is V2. The charging module 10 may calculate the input resistance R_in according to the current values I1, I2 and the measured voltage values V1, V2 as follows:

$$R\_in = \frac{V1 - V2}{I2 - I1}$$

In other words, the charging module 10 may input an input current I_in with a current value equal to I1 to the input terminal, to detect the voltage value V1, and then may input an input current I_in with a current value equal to I2 to the input terminal, to detect the voltage value V2. The input resistance R_in can thereby be set to be equal to the difference between the voltage value V1 and the voltage value V2 divided by the difference between the current value I2 and the current value I1. In such a situation, the input resistance R_in may represent the electrical characteristics (e.g., internal resistance) of the adaptor 202, and the charging module 10 connected to different adaptors may possess different values of the input resistance R_in.

The control module 104 then sets a lower limit voltage value VCL according to the input resistance R_in. In general, if the input resistance R_in is larger, the control module 104 may decrease the lower limit voltage value VCL; and if the input resistance R_in is smaller, the control module 104 may increase the lower limit voltage value VCL. The setting of the lower limit voltage value VCL may further be determined according to power requirements and current tolerance capability of the power receiving device 210 and power supply capability of the power supply terminal 200. In addition, the user may set the lower limit voltage value VCL according to requirements of the charging system 20.

Furthermore, at time t3, the control module 104 may control the input current I_in to increase, so that the input voltage signal V_in may decrease in accordance with the increasing input current I_in. When the input voltage signal V_in decreases to the lower limit voltage value VCL (e.g., at time t4), the control module 104 may start to control the input voltage signal V_in to remain on the lower limit voltage value VCL. At this moment, the input current I_in may fall slightly and then become stable in a period of time. After the input current I_in becomes stable, the control module 104 may record the magnitude of the input current I_in as an upper limit current value IOC. The control module 104 then determines a charging current value ICH of the charging module 10 according to the upper limit current value IOC. At time t5, the charging module 10 starts to charge the rechargeable battery 204 via the charging current value ICH, and the input voltage signal V_in rises to a higher voltage accordingly.

Please note that the magnitude of the charging current value ICH may be determined arbitrarily according to the upper limit current value IOC. Since the upper limit current value IOC is determined to be the upper limit of the current loading of the adaptor 202 or the upper limit of the current supported by the charging system 20, the charging current value ICH is usually set to a larger value smaller than the upper limit current value IOC, in order to provide a larger charging current and a higher charging efficiency in the tolerance range of the adaptor 202 or the charging system 20. In an embodiment, the charging current value ICH may be set to a predetermined ratio of the upper limit current value IOC. This predetermined ratio may be 80% or 90%. For example, if the upper limit current value IOC obtained in the above embodiment is 1 A, the charging current value ICH may be set to 800 mA or 900 mA. In another embodiment, the charging current value ICH may be set to the upper limit current value IOC minus a predetermined current value. For example, this predetermined current value may be 100 mA. If the upper limit current value IOC obtained in the above embodiment is 1.2 A, the charging current value ICH may be set to 1.1 A.

According to the embodiments of the present invention, the voltage level of the lower limit voltage value VCL may be determined from the value of the input resistance R_in; hence, the charging current value ICH may be indirectly determined according to the electrical characteristics (e.g., internal resistance) of the adaptor 202. As a result, for different types of the adaptor 202, the charging module 10 may apply the optimal charging current to charge the rechargeable battery 204 according to the electrical characteristics of the adaptor 202, in order to prevent an excessively low charging current from increasing the charging time, or an excessively high charging current which exceeds the current limit of the adaptor 202 or the charging system 20.

In addition, the determination of the charging current value ICH may be performed once the power receiving device 210 is connected to the adaptor 202. After the magnitude of the charging current value ICH is determined, the charging module 10 may store the determination results of the charging current value ICH in a buffer, and keep charging the rechargeable battery 204 via the charging current value ICH. Since the electrical characteristics of the adaptor 202 may not vary significantly, the charging current value ICH may not need to be changed or re-determined during a charging process.

Please note that one of the purposes of the present invention is to determine the optimal charging current for an electronic device. Those skilled in the art can make modifications and alternations accordingly. For example, in addition to the electrical characteristics of the adaptor 202, the lower limit voltage value VCL may further be determined according to power requirements and current tolerance capability of the power receiving device 210 and power supply capability of the power supply terminal 200, where the determination way may be determined via the waveforms shown in FIG. 3. For example, when the control module 104 controls the input current I_in to increase linearly, the input voltage signal V_in may decrease linearly, and then appear a more significant decrease after decreasing to some extent, as point A shown in FIG. 3. The significant decrease of the input voltage signal V_in means that the power receiving device 210 receives a current exceeding its tolerable range. The lower limit voltage value VCL can thereby be set to a level where the input voltage signal V_in starts to decrease significantly or a level slightly lower than the significantly decreasing position. In addition, after the input voltage signal V_in decreases to the lower limit voltage value VCL, the input current I_in may decrease slightly more and become stable in a period of time. At this moment, the control module 104 may monitor the input current I_in and the input voltage signal V_in, to confirm whether the input current I_in becomes stable and can be regarded as the upper limit current value IOC. The control module 104 may further ensure that the input voltage signal V_in remains on the lower limit voltage value VCL normally without returning to a higher voltage level.

Figure 4:
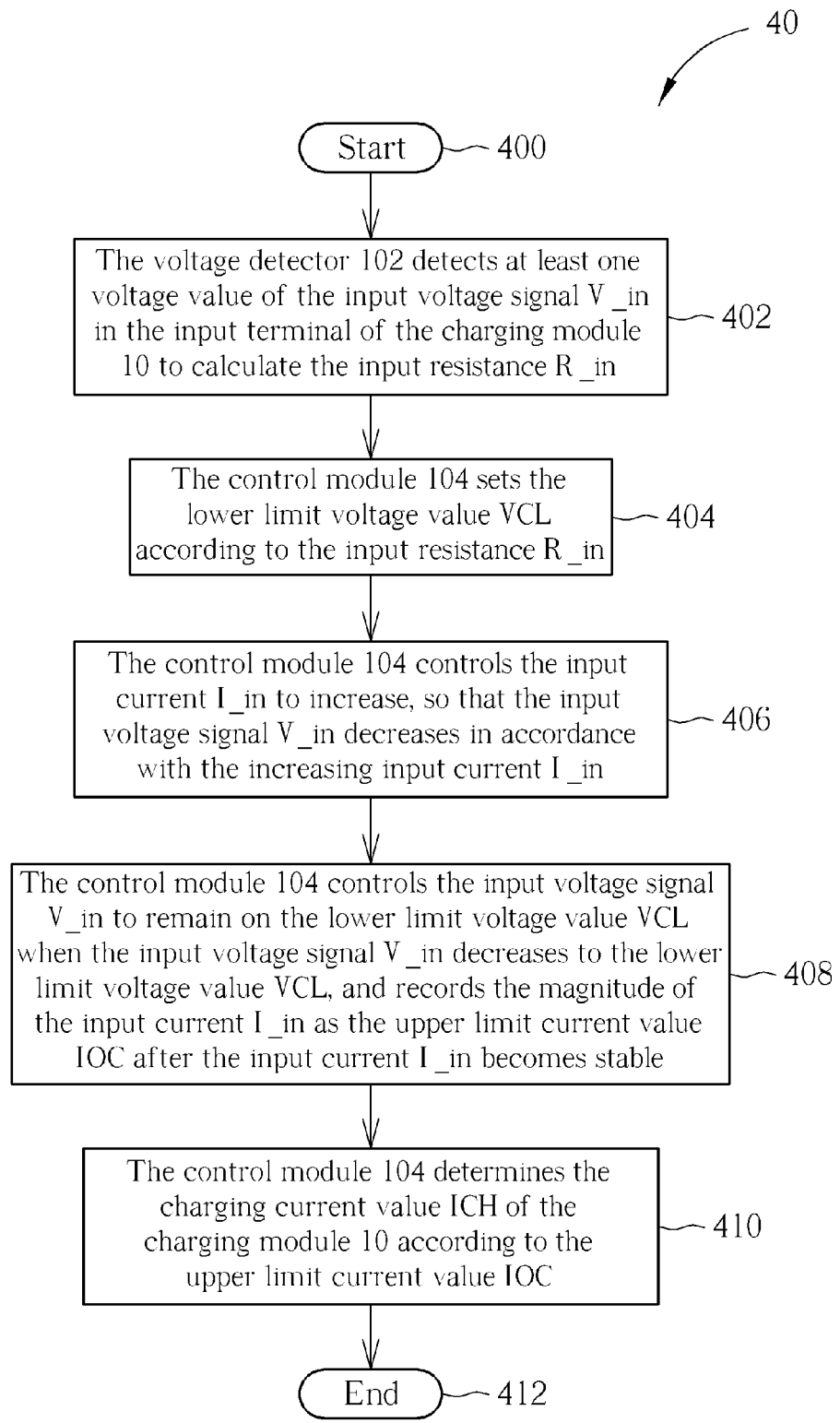
FIG. 4 is a schematic diagram of a charging current setting process according to an embodiment of the present invention.

The abovementioned operations related to the charging module 10 may be summarized into a charging current setting process 40, as shown in FIG. 4. The charging current setting process 40 includes the following steps:

Step 400: Start.

Step 402: The voltage detector 102 detects at least one voltage value of the input voltage signal V_in in the input terminal of the charging module 10 to calculate the input resistance R_in.

Step 404: The control module 104 sets the lower limit voltage value VCL according to the input resistance R_in.

Step 406: The control module 104 controls the input current I_in to increase, so that the input voltage signal V_in decreases in accordance with the increasing input current I_in.

Step 408: The control module 104 controls the input voltage signal V_in to remain on the lower limit voltage value VCL when the input voltage signal V_in decreases to the lower limit voltage value VCL, and records the magnitude of the input current I_in as the upper limit current value IOC after the input current I_in becomes stable.

Step 410: The control module 104 determines the charging current value ICH of the charging module 10 according to the upper limit current value IOC.

Step 412: End.

The detailed operations and alternations of the charging current setting process 40 can be referred to the above description, and will not be narrated hereinafter.

In the prior art, currently available charging methods always operate in a predetermined mode (e.g., the constant voltage mode or constant current mode) with a power supply terminal or a charging module of a power receiving terminal. These methods cannot apply different charging currents having different magnitudes to adapt to the loading capability of different adaptors. In comparison, the present invention may obtain the electrical characteristics (e.g., internal resistance) of the adaptor by detecting the input resistance of the charging module, and determine the corresponding upper limit current value according to the obtained electrical characteristics, in order to determine the optimal charging current value. The charging module may charge the rechargeable battery via the optimal charging current, in order to prevent an excessively low charging current from increasing the charging time, or an excessively high charging current which exceeds the current limit of the adaptor or the charging system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging current setting method for a charging module, comprising:
    detecting at least two voltage values associated with two input current values of an input voltage signal at an input terminal of the charging module to calculate an input resistance at the input terminal;
    setting a lower limit voltage value of the input voltage signal according to the input resistance;
    controlling an input current to increase its magnitude, so that voltage level of the input voltage signal decreases in accordance with increasing level of the input current;
    controlling the input voltage signal to remain on the lower limit voltage value when the input voltage signal is decreasing and reaches the lower limit voltage value, and recording a magnitude of the input current as an upper limit current value when the input voltage signal is on the lower limit voltage value and the input current becomes stable; and
    determining a charging current value of the charging module according to the upper limit current value.

2. The charging current setting method of claim 1, wherein the step of determining a charging current value of the charging module according to the upper limit current value comprises:
    setting the charging current value to a predetermined ratio of the upper limit current value.

3. The charging current setting method of claim 1, wherein the step of determining a charging current value of the charging module according to the upper limit current value comprises:
    setting the charging current value to the upper limit current value minus a predetermined current value.

4. The charging current setting method of claim 1, wherein the charging current value is smaller than the upper limit current value.

5. The charging current setting method of claim 1, wherein the step of detecting the at least two voltage values associated with two input current values of an input voltage signal at an input terminal of the charging module to calculate an input resistance at the input terminal comprises:
    inputting a current having a first current value to the input terminal to detect a first voltage value;
    inputting a current having a second current value to the input terminal to detect a second voltage value; and setting the input resistance to be equal to the difference between the first voltage value and the second voltage value divided by the difference between the second current value and the first current value.

6. The charging current setting method of claim 1, wherein the step of setting a lower limit voltage value according to the input resistance comprises:
decreasing the lower limit voltage value when the input resistance increases; and
increasing the lower limit voltage value when the input resistance decreases.

7. A charging module, comprising:
a charging device;
a voltage detector for detecting at least two voltage values associated with two input current values of an input voltage signal at an input terminal of the charging module to calculate an input resistance at the input terminal; and
a control module coupled to the charging device and the voltage detector for executing the following steps:
setting a lower limit voltage value of the input voltage signal according to the input resistance;
controlling an input current to increase its magnitude, so that voltage level of the input voltage signal decreases in accordance with increasing level of the input current;
controlling the input voltage signal to remain on the lower limit voltage value when the input voltage signal is decreasing and reaches the lower limit voltage value, and recording a magnitude of the input current as an upper limit current value when the input voltage signal is on the lower limit voltage value and the input current becomes stable; and
determining a charging current value of the charging module according to the upper limit current value;
wherein the charging device performs charging using the determined charging current value.

8. The charging module of claim 7, wherein the control module sets the charging current value to a predetermined ratio of the upper limit current value.

9. The charging module of claim 7, wherein the control module sets the charging current value to the upper limit current value minus a predetermined current value.

10. The charging module of claim 7, wherein the charging current value is smaller than the upper limit current value.

11. The charging module of claim 7, wherein the voltage detector detects the at least two voltage values associated with two input current values of the input voltage signal at the input terminal of the charging module to calculate the input resistance at the input terminal by executing the following steps:
inputting a current having a first current value to the input terminal to detect a first voltage value;
inputting a current having a second current value to the input terminal to detect a second voltage value; and
setting the input resistance to be equal to the difference between the first voltage value and the second voltage value divided by the difference between the second current value and the first current value.

12. The charging module of claim 7, wherein the control module decreases the lower limit voltage value when the input resistance increases, and increases the lower limit voltage value when the input resistance decreases.

* * * * *